United States Patent
Liu et al.

(10) Patent No.: US 12,359,590 B1
(45) Date of Patent: Jul. 15, 2025

(54) TURBOMACHINE WITH TURBINE SECTION HAVING INTEGRATED FLUID SEPARATOR

(71) Applicant: Garrett Transportation I Inc., Torrance, CA (US)

(72) Inventors: Yuxiang Liu, Shanghai (CN); Winne Guo, Shanghai (CN); Naifang Fu, Shanghai (CN); Yves Tang, Shanghai (CN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 18/652,338

(22) Filed: May 1, 2024

(51) Int. Cl.
*F01D 25/24* (2006.01)
*F01D 5/14* (2006.01)
*F01D 25/32* (2006.01)
*H01M 8/04111* (2016.01)

(52) U.S. Cl.
CPC ............. *F01D 25/24* (2013.01); *F01D 5/147* (2013.01); *F01D 25/32* (2013.01); *H01M 8/04111* (2013.01)

(58) Field of Classification Search
CPC ........... F05D 2220/40; F05D 2260/602; F05D 2240/50; F05D 2250/294; F05D 2250/51; F05D 2260/607; F05D 2260/608; F01D 5/147; F01D 25/32; F01D 17/165; F01D 25/24; F01D 25/16; F01D 9/045; F01D 11/08; F01D 9/041; F01D 9/026; F01D 25/125; F04D 25/045; H01M 8/04111
See application file for complete search history.

(56) References Cited

U.S. PATENT DOCUMENTS

| | | | |
|---|---|---|---|
| 7,204,241 B2* | 4/2007 | Thompson | F01M 13/021 123/573 |
| 7,921,646 B2* | 4/2011 | Swenson | F01D 25/32 137/251.1 |
| 11,377,979 B2* | 7/2022 | Ikeya | F02B 39/00 |
| 11,629,734 B2 | 4/2023 | Matsuzaki et al. | |
| 11,799,099 B2 | 10/2023 | Matsuzaki et al. | |
| 2024/0018879 A1* | 1/2024 | Shimizu | F02B 37/24 |

* cited by examiner

*Primary Examiner* — Eric J Zamora Alvarez
(74) *Attorney, Agent, or Firm* — LORENZ & KOPF, LLP (57) ABSTRACT

A turbomachine includes a turbine housing and a turbine wheel that cooperatively define a first flow path extending downstream from an inlet, across the turbine wheel, to a first outlet. The turbine housing defines a second flow path extending downstream from the inlet to a second outlet. The first flow path and the second flow path both extend through a separator chamber. The separator chamber is configured to separate a first fluid from a second fluid allowing the first fluid to flow along the first flow path toward the first outlet and allowing the second fluid to flow along the second flow path toward the second outlet.

20 Claims, 5 Drawing Sheets

TURBOMACHINE WITH TURBINE SECTION HAVING INTEGRATED FLUID SEPARATOR

TECHNICAL FIELD

The technical field generally relates to a turbomachine and, more particularly, relates to a turbomachine with a turbine section having an integrated fluid separator.

BACKGROUND

It is known to provide a turbomachine for various systems, such as fuel cell systems. For example, a fuel cell compressor device may be included for compressing air before it is fed to the fuel cell stack for increasing operating efficiency of the fuel cell system. Such turbomachines may also include a turbine section that, for example, receives exhaust from the fuel cell stack for driving the rotating group in rotation and further increasing operating efficiency.

However, conventional turbomachines suffer from various deficiencies. For example, performance of a turbine section may be limited by intake of a mixture of air and liquid water (e.g., liquid water droplets, slugs of water, etc.) that are exhausted from the fuel cell stack. The liquid water can inhibit operation of the turbine section, cause rotational surging, overload on the bearing, and/or otherwise negatively affect the turbomachine. The liquid water may also cause premature wear of the turbine wheel, the housing, the bearing, or other components.

Thus, some systems may include features for reducing liquid intake into the turbine section. However, including these features may increase costs, packaging size, weight, manufacturing complexity, or include other problems.

It is therefore desirable to provide a turbomachine with improved liquid ingestion capability. It is also desirable to provide a turbomachine that is less prone to wear due to liquid ingestion. Furthermore, it is desirable to provide a turbomachine of this kind at reduced cost, weight, and size. Moreover, it is desirable to provide a turbomachine of this kind with reduced manufacturing costs, time, etc. Other desirable features and characteristics of the present disclosure will become apparent from the subsequent detailed description and the appended claims, taken in conjunction with the accompanying drawings and this background discussion.

BRIEF SUMMARY

In an example embodiment, a turbomachine with a turbine section is disclosed that includes a turbine wheel supported for rotation about an axis. The turbomachine also includes a turbine housing that houses the turbine wheel and that includes an inlet, a first outlet, and a second outlet. The inlet is configured to receive an inlet flow that includes a first fluid and a second fluid. The turbine housing includes a first housing member. The first housing member at least partly defines a separator chamber of the turbine housing. The first housing member at least partly defines the second outlet. The turbine housing and the turbine wheel cooperatively define a first flow path extending downstream from the inlet, across the turbine wheel, to the first outlet. The turbine housing defines a second flow path extending downstream from the inlet to the second outlet. The first flow path and the second flow path both extend through the separator chamber. The separator chamber is configured to separate the first fluid from the second fluid allowing the first fluid to flow along the first flow path toward the first outlet and allowing the second fluid to flow along the second flow path toward the second outlet.

In another example embodiment, a method of manufacturing a turbomachine with a turbine section is disclosed. The method includes supporting a turbine wheel for rotation about an axis within a turbine housing. The turbine housing including an inlet, a first outlet, and a second outlet. The inlet is configured to receive an inlet flow that includes a first fluid and a second fluid. The turbine housing includes a first housing member that at least partly defines a separator chamber of the turbine housing. The first housing member at least partly defines the second outlet. The method further includes defining, cooperatively with the turbine housing and the turbine wheel, a first flow path extending downstream from the inlet, across the turbine wheel, to the first outlet. Moreover, the method includes defining, with the turbine housing, a second flow path extending downstream from the inlet to the second outlet, the first flow path and the second flow path both extending through the separator chamber. The separator chamber is configured to separate the first fluid from the second fluid allowing the first fluid to flow along the first flow path toward the first outlet and allowing the second fluid to flow along the second flow path toward the second outlet.

In an additional embodiment, a fuel cell system is disclosed that includes a fuel cell stack and a turbomachine with a turbine section that is fluidly coupled to the fuel cell stack and configured to receive an exhaust stream therefrom. The turbine section includes a turbine wheel supported for rotation about an axis and a turbine housing that houses the turbine wheel and that includes an inlet, a first outlet, and a second outlet. The inlet is configured to receive the exhaust stream as an inlet flow that includes a first fluid and a second fluid. The turbine housing includes a first housing member that is unitary. The first housing member at least partly defines a separator chamber of the turbine housing. The first housing member at least partly defines the second outlet. The turbine housing and the turbine wheel cooperatively define a first flow path extending downstream from the inlet, across the turbine wheel, to the first outlet. The turbine housing defines a second flow path extending downstream from the inlet to the second outlet. The first flow path and the second flow path both extend through the separator chamber. The separator chamber is configured to separate the first fluid from the second fluid allowing the first fluid to flow along the first flow path toward the first outlet and allowing the second fluid to flow along the second flow path toward the second outlet.

BRIEF DESCRIPTION OF DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Broadly, example embodiments disclosed herein include a turbomachine with a turbine section that includes an integral fluid separator. In other words, the turbine section includes fluid separator features that are integrated therewith. The turbine section may be a radial-inlet turbine section with an inlet directed substantially radially with respect to an axis of rotation of the turbine wheel. Also, the turbine housing may define plural fluid paths, passages, etc., extending from the inlet and through the turbine section toward either a first fluid outlet or a second fluid outlet. A gas and liquid fluid mixture (e.g., air and liquid water droplets) may be received by the inlet, and the liquid may be separated from the air in a separator chamber of the turbine housing. The liquid may be drained from the turbine housing via the first fluid outlet (e.g., a drain, drain hole, drain pipe, drain feature, etc.) that is integrated in the turbine housing. With the liquid separated therefrom, air in the turbine section may continue through the turbine section, across the turbine wheel, and may exit the turbine section via the second fluid outlet.

Accordingly, the turbomachine has improved liquid ingestion capability and can ingest liquid water without negatively affecting turbine performance. Also, the turbomachine of the present disclosure has improved wear resistance. Moreover, the fluid separator features may be integrated in the turbomachine housing in a lightweight, compact package. Furthermore, the turbomachine may be manufactured efficiently.

Figure 1:
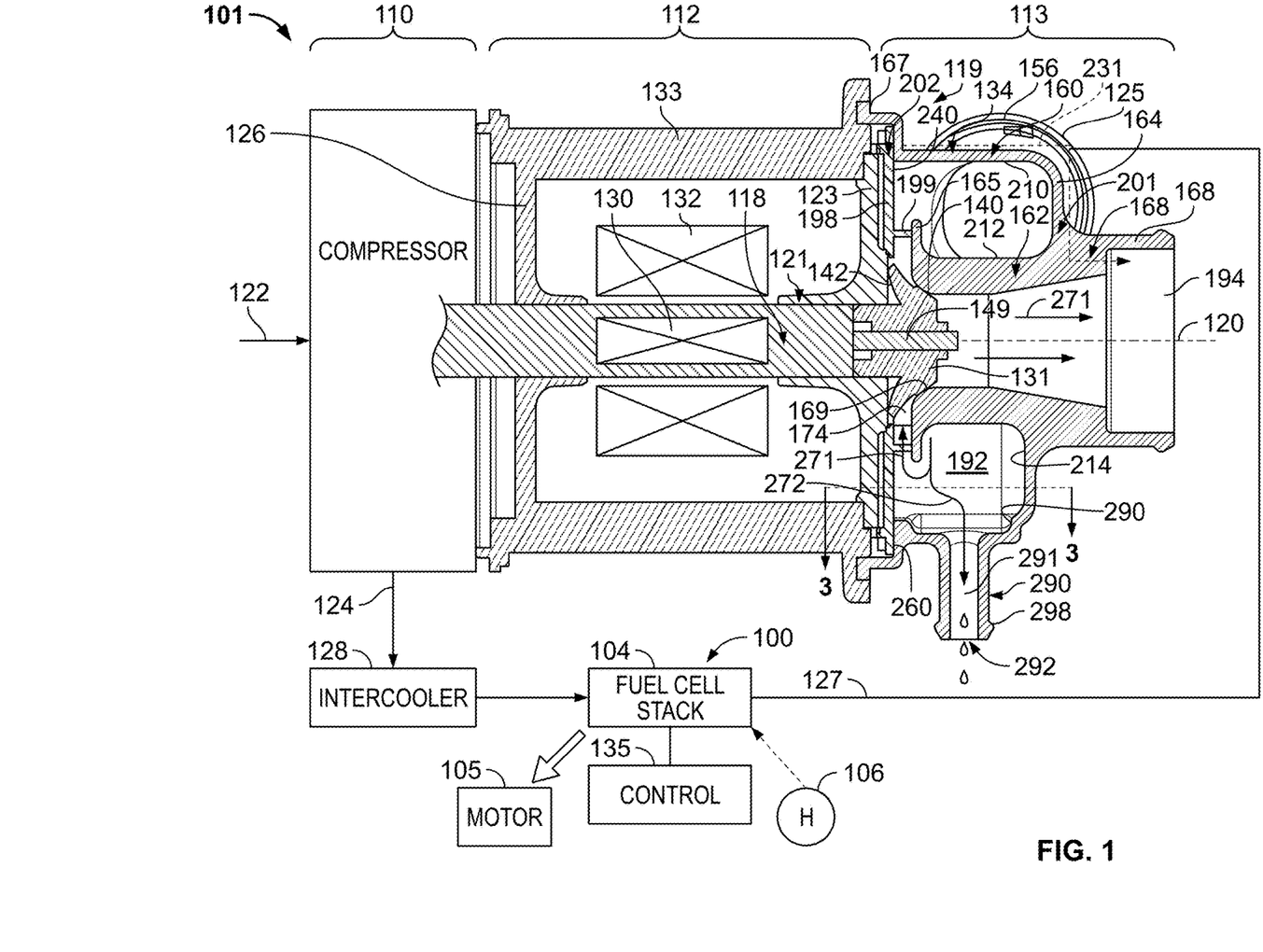
FIG. 1 is a schematic diagram of a fuel cell system with an example turbomachine having an integrated fluid separator according to example embodiments of the present disclosure.

Referring initially to FIG. 1, a turbomachine 101 is shown according to example embodiments. As shown, the turbomachine 101 generally includes a housing 119 and a rotating group 118 supported for rotation within the housing 119 about an axis of rotation 120 by one or more bearings 121. In some embodiments, the rotating group 118 and the housing 119 may cooperatively define a compressor section 110 (i.e., compressor stage) and a turbine section 113 (i.e., turbine stage). Also, a motor section 112 may be disposed axially (i.e., along the axis 120) between the compressor and turbine sections 110, 113.

The bearing 121 of the turbomachine 101 supports the rotating group 118 for rotation within the housing 119. The bearing 121 may have various configurations without departing from the scope of the present disclosure. In the illustrated embodiment, the bearing 121 is an air bearing (fluid bearing, etc.) that includes a first bearing housing 123 and second bearing housing 126, which are spaced apart along the axis 120. It will be appreciated that the bearing 121 may be configured differently, for example, as a rolling element bearing system, or otherwise. The bearing may 121 also include an oil-fed journal bearing of various architectures (e.g., fully floating, semi-floating, split, coupled, etc.). Moreover, the bearing 121 may include an oil-fed rolling element bearing in some embodiments.

The rotating group 118 may generally include a shaft 149 that extends axially through the first and second bearing housings 123, 126 and to extend through the compressor section 110, the turbine section 113, and the motor section 112. The motor section 112 may include a rotor member 130 that is operatively mounted to the shaft 149 and a stator member 132 that is supported within a motor housing 133 of the housing 119 (i.e., axially between the first and second bearing housing members 123, 126). The rotating group 118 may also include a turbine wheel 131, which is mounted on one end of the shaft 149. The turbine wheel 131 may include a plurality of blades and may define a front axial face 140 and a back axial face 142, which face in opposite directions along the axis 120. Radial ends of the blades may provide the front axial face 140 with a convexly contoured side profile as shown in FIG. 1. The turbine wheel 131 may be formed from a stainless steel material in some embodiments. The turbine wheel 131 may be housed within a turbine housing 134 of the housing 119. The turbine housing 134 may be attached to one axial end of the motor housing 133 and will be discussed in detail below.

Moreover, it will be appreciated that the compressor section 110 (shown schematically) may include a compressor wheel that is mounted on the end of the shaft 149 opposite the turbine wheel 131. It will also be appreciated that the compressor section 110 may include a compressor housing that houses the compressor wheel and that is attached to the axial end of the motor housing 133 opposite the turbine housing 134.

In some embodiments, the turbomachine 101 may be operatively connected to a fuel cell system 100 and may be configured as an e-charger or electric motorized compressor device for the fuel cell system 100. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle.

During operation, the motor section 112 may drive rotation of the rotating group 118, an inlet airstream (represented by arrows 122 in FIG. 1) may flow into the compressor section 110, and the compressor section 110 may provide a compressed air stream (represented by arrow 124) to an intercooler 128 as it flows to the fuel cell stack 104 for boosting the operating efficiency of the fuel cell system 100.

Furthermore, the exhaust stream 127 from the fuel cell stack 104 may be directed back toward into an inlet 125 of the turbine section 113 and across the turbine wheel 131 before exiting the turbomachine 101 via a first fluid outlet 194 of the turbine housing 134. Fluid power from the exhaust stream 127 may drive the turbine wheel 131 in rotation, and this mechanical power may be converted to electrical power for the motor section 112 for ultimately assisting in rotation of the compressor wheel in the compressor section 110.

Various components of the fuel cell system 100 and/or the turbomachine 101 may be controlled by a control system 135. The control system 135 may be a computerized system with a processor, various sensors, and other components for electrically controlling these operations (e.g., controlling speed of the motor in the motor section 112). In some embodiments, the control system 135 may define or may be part of the electrical control unit (ECU) of a vehicle.

It will be appreciated, however, that other configurations of the turbomachine 101 fall within the scope of the present disclosure. For example, the turbomachine 101 of the present disclosure may be provided in other systems (i.e., other than fuel cell systems). Moreover, features of the turbine section 113 may be included in a turbocharger or other turbomachine without departing from the scope of the present disclosure.

Figure 3:
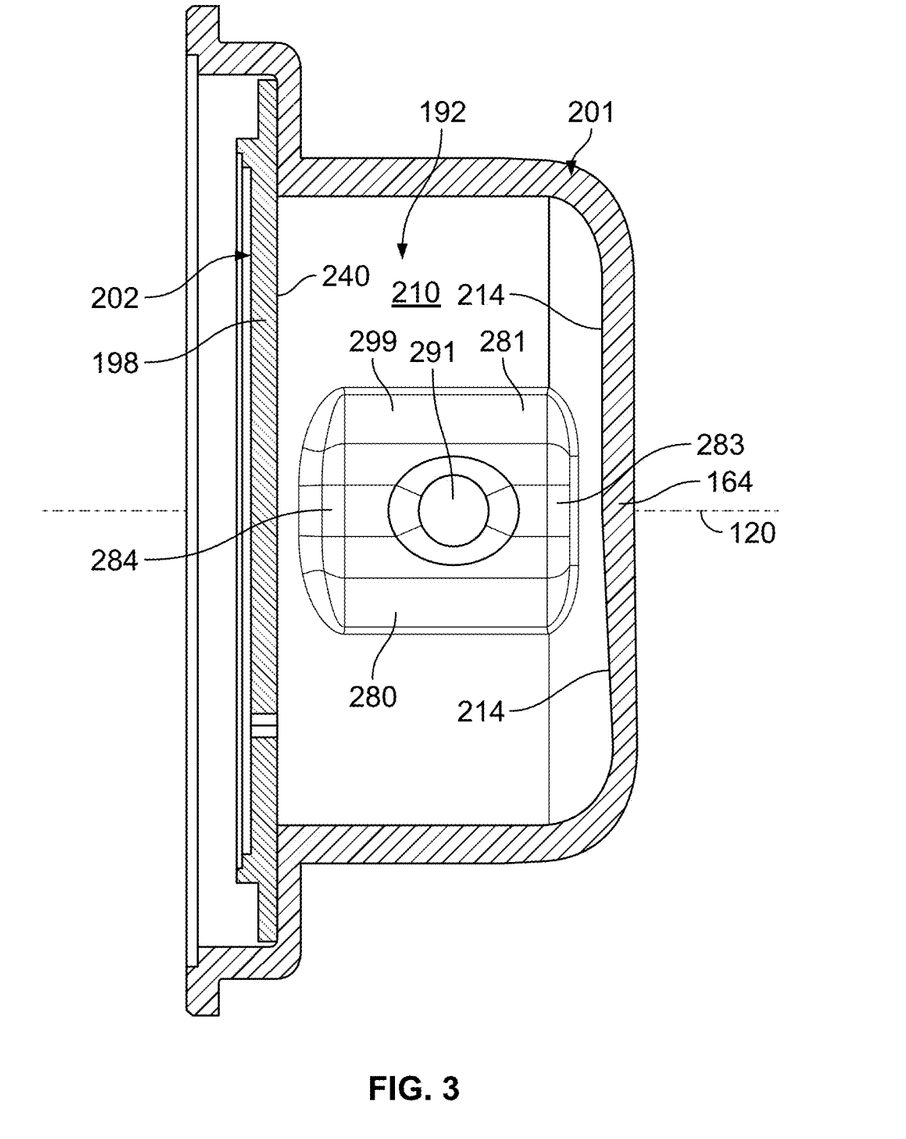
FIG. 3 is a plan view of a fluid outlet of the turbomachine taken along the line 3-3 of FIG. 1.
Figure 4:
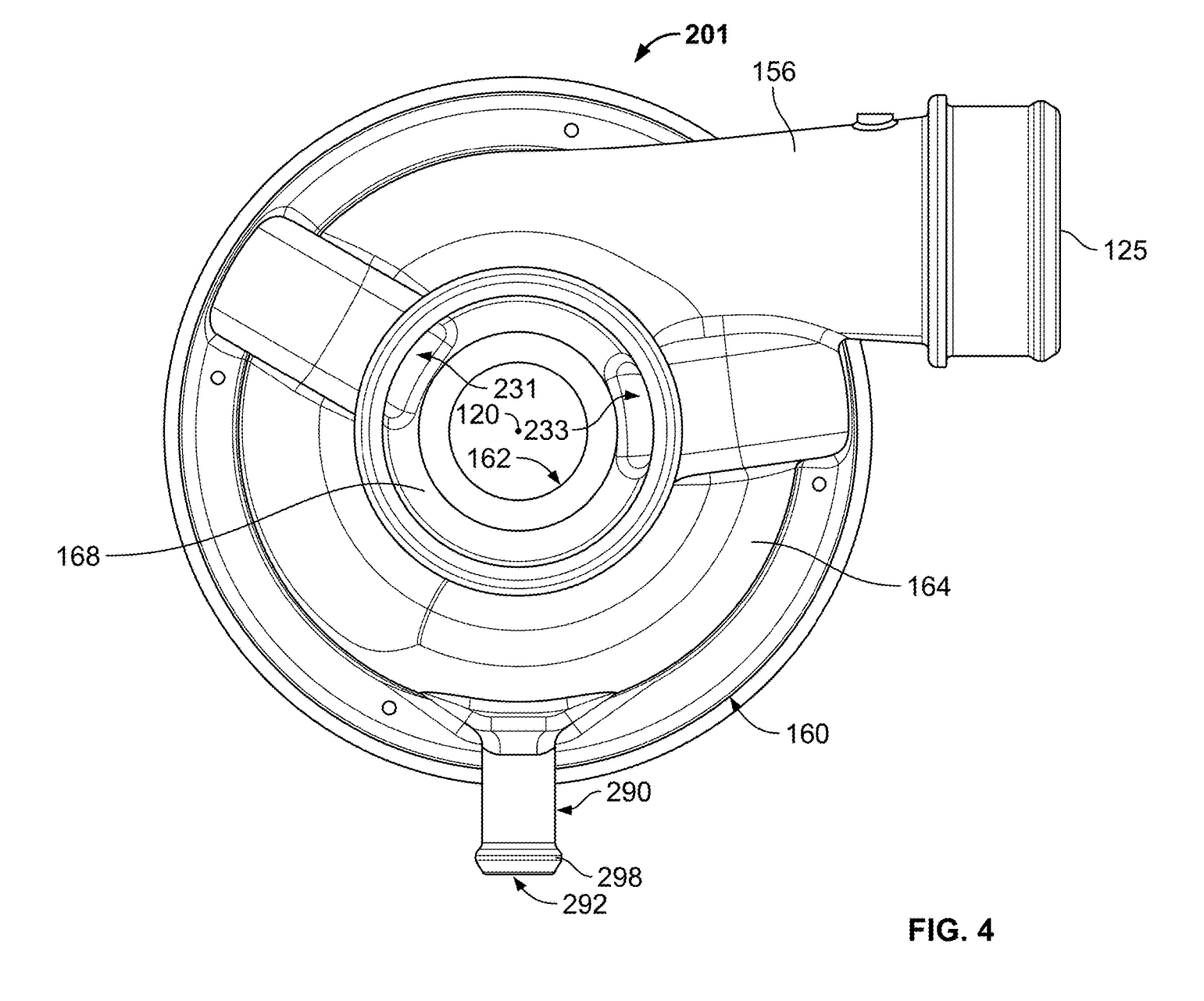
FIG. 4 is an outer side view of the first turbine housing member of FIG. 2.
Figure 5:
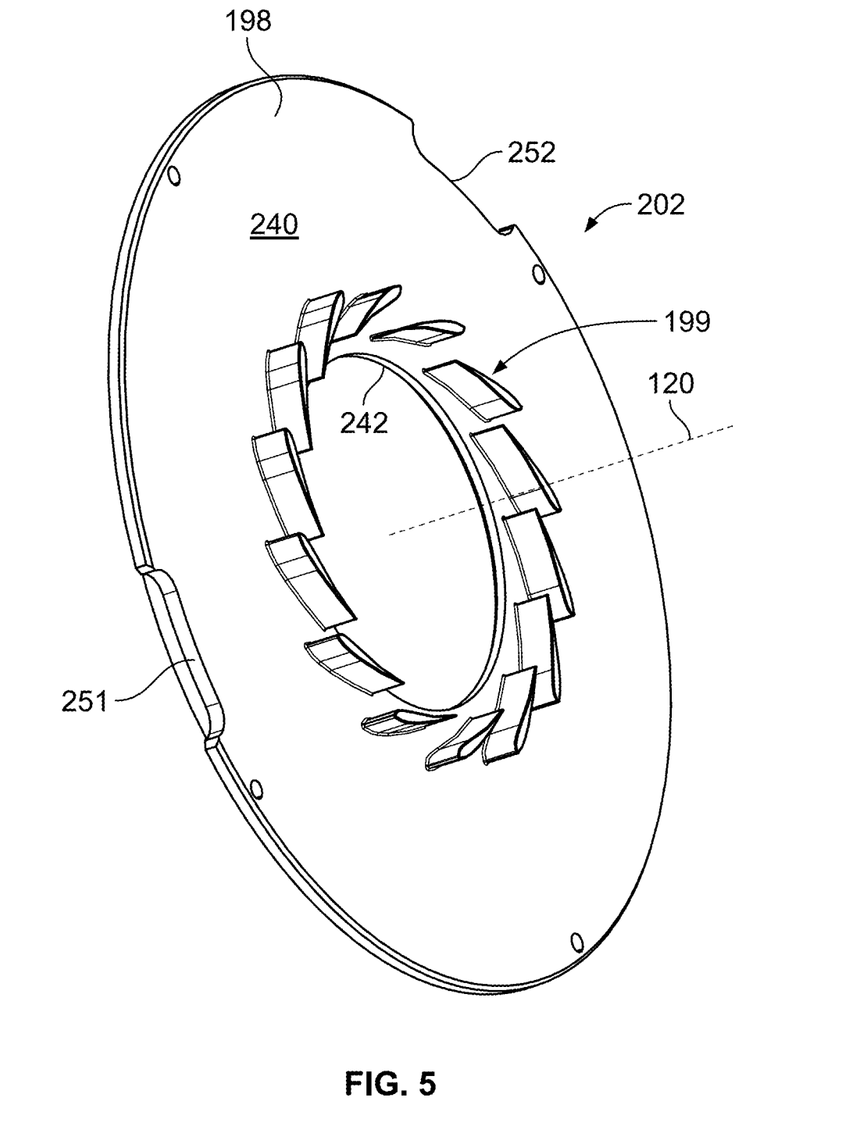
FIG. 5 is an isometric view of a second turbine housing member of the turbomachine of FIG. 1.

Referring now to FIGS. 1-5, the turbine housing 134 of the turbomachine 101 will be discussed in greater detail according to example embodiments. As shown, the turbine housing 134 may include a first housing member 201 (FIGS. 1-4) and a second housing member 202 (FIGS. 1 and 5). The first housing member 201 (i.e., turbine shroud member) and the second housing member 202 (i.e., seal plate) may be attached together and/or attached to the motor housing 133. As such, the first housing member 201 and the second housing member 202 may cooperatively house the turbine wheel 131. Generally, the first housing member 201 may cover over and oppose the front axial face 140 of the turbine wheel 131, and the second housing member 202 may cover over and oppose the back axial face 142 of the turbine wheel 131.

Figure 2:
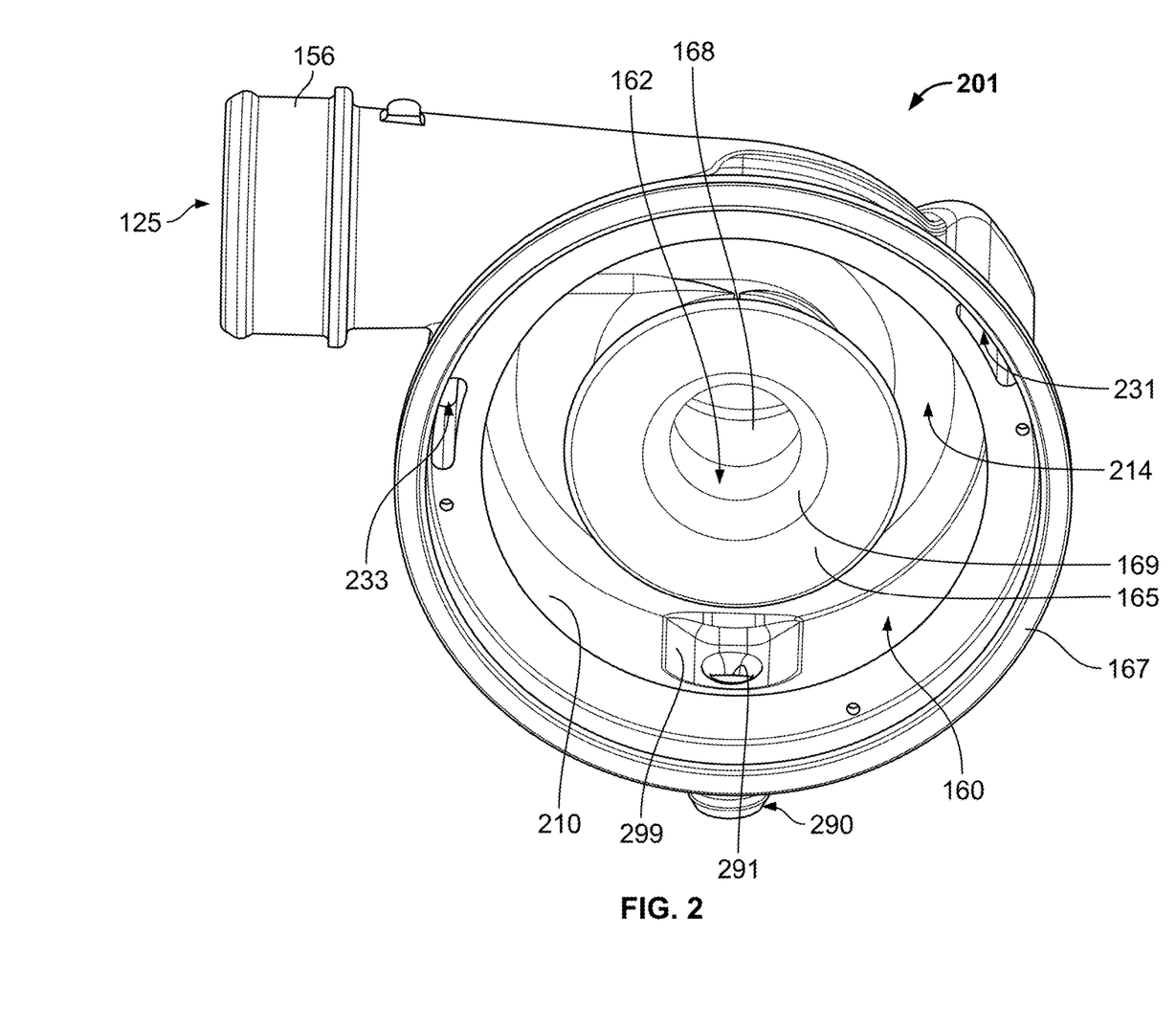
FIG. 2 is an isometric view of a first turbine housing member of the turbomachine of FIG. 1 according to example embodiments.

As shown in FIGS. 2 and 4, the first housing member 201 may be a unitary, one-piece part that includes a number of features that will be discussed in detail below. In additional embodiments, these features may be assembled together from a plurality of parts to define the first housing member 201.

In some embodiments, the first housing member 201 may be formed from (e.g., cast from) an aluminum alloy material. The first housing member 201 may include an annular outer radial wall 160, an annular inner radial wall 162, and an axial wall 164. The outer radial wall 160 and the inner radial wall 162 may be spaced apart in the radial direction with respect to the axis 120, and the axial wall 164 may extend radially between the outer and inner radial walls 160, 162 on one axial end thereof. On the opposite axial end of the first housing member 201, the inner radial wall 162 may turn radially outward to define a lip 165 (FIGS. 1 and 2). The first housing member 201 may also include a turbine shroud surface 169 that is convexly-contoured, annular, and centered about the axis 120. Additionally, the open end of the outer radial wall 160 of the first housing member 201 may be stepped outwardly radially to define an annular attachment rim 167.

The first housing member 201 may further include an inlet pipe 156. The inlet pipe 156 may extend radially and tangentially to connect to the outer radial wall 160. The inlet pipe 156 may be cylindrical with the inlet 125 extending therethrough substantially in the radial direction to fluidly connect to the interior of the first housing member 201. The inlet 125 may have a rounded (e.g., circular) cross section.

The first housing member 201 may also include an outlet pipe 168, which projects axially from the axial wall 164, away from the turbine wheel 131. The outlet pipe 168 may be cylindrical and centered on the axis 120, and the first fluid outlet 194 may extend therethrough. The first fluid outlet 194 may have a rounded (e.g., circular) cross section taken normal to the axis 120. The first fluid outlet 194 may be stepped for connection to a downstream line, pipe, or other fluid conduit (not shown).

The first housing member 201 may define at least part of a separator chamber 192 of the turbine housing 134. The separator chamber 192 may extend annularly and continuously about the axis 120. The separator chamber 192 may be defined by an inner diameter surface 210 of the outer radial wall 160, an opposing outer diameter surface 212 of the inner radial wall 162, an inner axial surface 214 of the axial wall 164, and the lip 165 of the first housing member 201. The separator chamber 192 may be toroid-shaped and substantially centered on the axis 120. The separator chamber 192 may define a substantially rectangular cross section taken along the axis 120 as shown in FIG. 1. In some embodiments, this cross section (i.e., the cross-sectional area or profile) may remain substantially constant as the chamber 192 extends about the axis 120. In other embodiments, the chamber 192 may be a volute passage in which the cross-sectional area gradually changes as it extends about the axis 120. The chamber 192 may extend helically about the axis 120 in some embodiments as well (i.e., the chamber 192 may advance along the axis 120 as the chamber 192 extends about the axis 120). The inlet pipe 156 may extend into the outer radial wall 160 such that the inlet 125 fluidly connects to the separator chamber 192.

In some embodiments, the first housing member 201 may further include at least one bearing fluid line, such as a first bearing fluid line 231 and a second bearing fluid line 233. As shown in FIG. 2, the first bearing fluid line 231 may include an inlet that is open proximate the attachment rim 167, and as shown in FIG. 4, the outlet of the first bearing fluid line 231 may be open on the outlet pipe 168 to fluidly connect to the outlet 194 of the turbine section 113.

Additionally, the first housing member 201 may include a drain pipe 290. The drain pipe 290 may project radially outward from the outer radial wall 160. A drain hole 291 may extend longitudinally through the drain pipe 290 and the inner diameter surface 210 of the outer radial wall 160 to fluidly connect to the separator chamber 192 and define a second fluid outlet 292 of the turbine section 113. The longitudinal axis of the drain hole 291 may be directed normal to the axis 120, and/or the longitudinal axis of the drain hole 291 may intersect the axis 120. The drain hole 291 may have a rounded (e.g., circular cross section) as shown in FIG. 3. Also, the drain pipe 290 may include an annular flange 298 on its outer terminal end for coupling to a drain hose, pipe, or other fluid line. The drain pipe 290 may be disposed angularly about the axis 120 at a position on the first housing member 201 where the drain hole 291 is likely to be lowest in relation to the direction of gravity. In other words, the drain pipe 290 may extend radially outward from a bottom of the first housing member 201 in relation to the direction of gravity. Accordingly, the drain hole 291 may be a gravity-fed drain of the turbine section 113 as will be discussed.

As shown in FIGS. 1-3, the first housing member 201 may also include one or more concave sink surfaces 299 that are concavely contoured and that transition between the inner diameter surface 210 of the first housing member 201 and the drain hole 291. As shown, there may be four sink surfaces 299 that are recessed radially outward and into the inner diameter surface 210. There may be two circumferential sink surfaces 280, 281 with a respective radius that gradually changes as the surfaces 280, 281 extend in the circumferential direction from the hole 291. There may also be two axial sink surfaces 283, 284 with a respective radius that gradually changes as the surfaces 283, 284 extend in the axial direction from the hole 291.

The outer radial wall 160 of the first housing member 201 may be fixed to the axial face of the motor housing 133, on an axial side that is opposite the compressor housing 152. As such, the first housing member 201 may cover over the front axial face 140 of the turbine wheel 131 of the rotating group 118. The turbine shroud surface 169 may oppose the turbine wheel 131 and may have inverse contour relative thereto. The first housing member 201 may attached via fasteners (e.g., threaded bolts) to the motor housing 133 in some embodiments.

As shown in FIG. 5, the second housing member 202 may be a unitary, one-piece part with a number of features that are integrally connected. In other embodiments, the second housing member 202 may be assembled from a plurality of parts. In some embodiments, the second housing member 202 may be formed from (e.g., cast from) an aluminum alloy material. The second housing member 202 may include a back plate 198 and a plurality of vane members 199. The back plate 198 may be relatively flat and annular with a central opening 242. The back plate 198 may include a front flow surface 240 that extends substantially perpendicular to the axis 120 and that faces along the axis 120 away from the motor section 112. The vane members 199 may be airfoil-shaped and may project axially from the front flow surface 240. The plurality of vane members 199 may be arranged about the axis. 120. The vane members 199 may be spaced apart evenly and circumferentially about the central opening 242. Also, the second housing member 202 may include a first notch 251 and a second notch 252, which are spaced apart circumferentially along the outer radial edge of the back plate 198.

When the turbine housing 134 is assembled and attached to the motor housing 133 (FIG. 1), the attachment rim 167 of the first housing member 201 may be engaged to a corresponding attachment feature (e.g., a stepped groove, rim, etc.) of the motor housing 133. Also, the outer radial edge of the back plate 198 may be disposed between the first housing member 201 and the first bearing housing member 123 as shown in FIG. 1. In some embodiments, fasteners (e.g., bolts) may extend through both the first housing member 201 and the outer radial edge of the back plate 198 and may threadably attach to the motor housing 133. There may be a substantially hermetically sealed outer radial coupling 260 between the back plate 198 and the first housing member 201. A sealant, a seal member, etc. may be included at the outer radial coupling 260 to provide the hermetic seal. Additionally, in this position, the first notch 251 and the second notch 252 of the back plate 198 may be aligned with the first and second bearing fluid lines 231, 233, respectively. As such, the notches 251, 252 and the bearing fluid lines 231, 233 may fluidly connect the bearings 121 with the first fluid outlet 194. Moreover, the shroud surface 169 may oppose the tips of the blades on the front axial face 140 of the turbine wheel 131. Additionally, the flow surface 240 of the back plate 198 may be spaced apart axially from the lip 165 of the first housing member 201. The free axial end of vane members 199 may be disposed in close proximity (i.e., immediately adjacent) the lip 165. In some embodiments, the vane members 199 may abut or otherwise engage the lip 165. Furthermore, a sealant, a seal member, etc. may be provided between the vane members 199 and the lip 165 to provide a hermetic seal therebetween.

As such, the first housing member 201, the second housing member 202, and the turbine wheel 131 may cooperatively define a plurality of flow paths that direct the exhaust stream 127 through the turbine section 113. More specifically, the turbine housing 134 and the turbine wheel may cooperatively define a first flow path 271 and a second flow path 272 that both extend downstream from the inlet 125, and circumferentially through the separator chamber 192.

The first flow path 271 may branch away from the second flow path 272 and out of the separator chamber 192 in a downstream direction axially toward the flow surface 240. Further downstream, the first flow path 271 may be directed radially inward and into a turbine wheel upstream area 174 defined axially between the flow surface 240 and the lip 165 and radially along the flow surface 240 and lip 165. The vane members 199 may be disposed within the turbine wheel upstream area 174 so as to direct the first flow path 271 toward the turbine wheel 131 for effective operation. The first flow path 271 may be directed downstream from the turbine wheel upstream area 174, across the turbine wheel (i.e., between the turbine wheel 131 and the shroud surface 169), and may turn axially toward the outlet 194 to be directed out of the turbine section 113.

The first housing member 201 of the turbine housing 134 may also define the second flow path 272. The second flow path 272 may extend from the inlet 125 and circumferentially into the separator chamber 192 with the first flow pay 271. Also, the second flow path 272 may branch from the first flow path 271 within the separator chamber 192 to be directed downstream across the sink surfaces 299 and out of the turbine housing 134 via the drain hole 291 of the second fluid outlet 292.

Under some operating conditions of the fuel cell system 100, the exhaust stream 127 may contain a mixture of air and liquid water (e.g., water droplets, etc.). This mixture may be received by the inlet 125. Momentum of the relatively dense water droplets may carry the liquid against the inner diameter surface 210 and surrounding interior surfaces of the separator chamber 192. The liquid may continue along the second flow path 272 and may flow circumferentially along inner diameter surface 210 to drain from the second fluid outlet 292. Meanwhile, air may flow along the first flow path 271 in a downstream direction from the inlet 125, through separator chamber 192, into the turbine wheel upstream area 174, past the turbine wheel 131 and shroud surface 189, and into the first fluid outlet 194 to flow out of the turbomachine 101. This fluid flow may drive the turbine wheel 131 in rotation to provide mechanical power to the rotating group 118.

Thus, the turbomachine of the present disclosure may have improved liquid ingestion capability. The turbine section may ingest liquid water without negatively affecting turbine performance. Also, the turbomachine of the present disclosure has better wear resistance because water may be removed instead of flowing to the turbine wheel. Moreover, the fluid separator features may be integrated in the turbomachine housing in a lightweight, compact package. Furthermore, the turbomachine may be manufactured efficiently. In particular, the housing 119 at the turbine section 113 can be attached together with relatively few steps and may have a relatively low part count.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A turbomachine with a turbine section comprising:
   a turbine wheel supported for rotation about an axis;

a turbine housing that houses the turbine wheel and that includes an inlet, a first outlet, and a second outlet, the inlet configured to receive an inlet flow that includes a first fluid and a second fluid;

the turbine housing including a first housing member, the first housing member at least partly defining a separator chamber of the turbine housing, the first housing member at least partly defining the second outlet; and the turbine housing and the turbine wheel cooperatively defining a first flow path extending downstream from the inlet, across the turbine wheel, to the first outlet, the turbine housing defining a second flow path extending downstream from the inlet to the second outlet, the first flow path and the second flow path both extending through the separator chamber, the separator chamber configured to separate the first fluid from the second fluid allowing the first fluid to flow along the first flow path toward the first outlet and allowing the second fluid to flow along the second flow path toward the second outlet.

2. The turbomachine of claim 1, wherein the turbine wheel includes a front face and a back face that face in opposite directions along the axis;

wherein the inlet is directed radially with respect to the axis; and wherein the turbine housing includes a second housing member that cooperates with the first housing member to house the turbine wheel, the front face facing toward the first housing member along the axis, and the back face facing toward the second housing member.

3. The turbomachine of claim 2, wherein the second housing member is unitary and includes a flow surface facing the back face of the turbine wheel; and wherein the first housing member and the flow surface cooperatively define a turbine wheel upstream area of the first flow path.

4. The turbomachine of claim 3, wherein the second housing member includes a plurality of vane members that project axially from the flow surface, the vane members disposed in the turbine wheel upstream area of the first flow path.

5. The turbomachine of claim 4, wherein the separator chamber is defined by an inner radial wall, an outer radial wall, an axial wall, and a lip of the first housing member, the inner radial wall and the outer radial wall spaced apart radially with respect to the axis, the axial wall extending radially between the inner radial wall and the outer radial wall, the lip spaced apart axially from the axial wall with respect to the axis, the lip projecting radially from the inner radial wall; and wherein the flow surface and the lip cooperatively define the turbine wheel upstream area of the first flow path; and wherein the plurality of vane members are disposed axially between the flow surface and the lip.

6. The turbomachine of claim 1, wherein the second outlet is a drain hole extending through the first housing member and fluidly connected to the separator chamber.

7. The turbomachine of claim 6, wherein the separator chamber is defined by an inner surface of the first housing member, and wherein the first housing member includes at least one concave sink surface that is contoured and transitions between the inner surface and the drain hole.

8. The turbomachine of claim 7, wherein the at least one concave sink surface surrounds the drain hole.

9. The turbomachine of claim 1, wherein the turbine wheel is made from a steel material, and wherein the first housing member is made from an aluminum alloy.

10. The turbomachine of claim 1, wherein the first housing member is unitary.

11. A method of manufacturing a turbomachine with a turbine section comprising:

supporting a turbine wheel for rotation about an axis within a turbine housing, the turbine housing including an inlet, a first outlet, and a second outlet, the inlet configured to receive an inlet flow that includes a first fluid and a second fluid, the turbine housing including a first housing member that at least partly defines a separator chamber of the turbine housing, the first housing member at least partly defining the second outlet;

defining, cooperatively with the turbine housing and the turbine wheel, a first flow path extending downstream from the inlet, across the turbine wheel, to the first outlet; and defining, with the turbine housing, a second flow path extending downstream from the inlet to the second outlet, the first flow path and the second flow path both extending through the separator chamber, the separator chamber configured to separate the first fluid from the second fluid allowing the first fluid to flow along the first flow path toward the first outlet and allowing the second fluid to flow along the second flow path toward the second outlet.

12. The method of claim 11, wherein the turbine wheel includes a front face and a back face that face in opposite directions along the axis;

wherein supporting the turbine wheel for rotation about the axis within the turbine housing includes:

directing the inlet radially with respect to the axis; and housing the turbine wheel cooperatively with a second housing member of the turbine housing and the first housing member, the front face facing toward the first housing member along the axis, and the back face facing toward the second housing member.

13. The method of claim 12, wherein the second housing member is unitary and includes a flow surface facing the back face of the turbine wheel; and wherein the first housing member and the flow surface cooperatively define a turbine wheel upstream area of the first flow path.

14. The method of claim 13, wherein the second housing member includes a plurality of vane members that project axially from the flow surface; and wherein supporting the turbine wheel for rotation about the axis within the turbine housing includes disposing the vane members in the turbine wheel upstream area of the first flow path.

15. The method of claim 14, wherein the separator chamber is defined by an inner radial wall, an outer radial wall, an axial wall, and a lip of the first housing member, the inner radial wall and the outer radial wall spaced apart radially with respect to the axis, the axial wall extending radially between the inner radial wall and the outer radial wall, the lip spaced apart axially from the axial wall with respect to the axis, the lip projecting radially from the inner radial wall; and further comprising defining, cooperatively with the flow surface and the lip, the turbine wheel upstream area of the first flow path, wherein the plurality of vane members are disposed axially between the flow surface and the lip.

16. The method of claim 11, wherein the second outlet is a drain hole extending through the first housing member and fluidly connected to the separator chamber.

17. The method of claim 16, wherein the separator chamber is defined by an inner surface of the first housing member, and wherein the first housing member includes at least one concave sink surface that is contoured and transitions between the inner surface and the drain hole.

18. The method of claim 11, further comprising forming the first housing member.

19. The method of claim 18, wherein forming the first housing member includes forming the first housing member from an aluminum alloy; and
wherein the turbine wheel is made from a steel material.

20. A fuel cell system comprising:
a fuel cell stack; and
a turbomachine with a turbine section that is fluidly coupled to the fuel cell stack and configured to receive an exhaust stream therefrom;
the turbine section including:
a turbine wheel supported for rotation about an axis;
a turbine housing that houses the turbine wheel and that includes an inlet, a first outlet, and a second outlet, the inlet configured to receive the exhaust stream as an inlet flow that includes a first fluid and a second fluid;
the turbine housing including a first housing member that is unitary, the first housing member at least partly defining a separator chamber of the turbine housing, the first housing member at least partly defining the second outlet; and
the turbine housing and the turbine wheel cooperatively defining a first flow path extending downstream from the inlet, across the turbine wheel, to the first outlet, the turbine housing defining a second flow path extending downstream from the inlet to the second outlet, the first flow path and the second flow path both extending through the separator chamber, the separator chamber configured to separate the first fluid from the second fluid allowing the first fluid to flow along the first flow path toward the first outlet and allowing the second fluid to flow along the second flow path toward the second outlet.

* * * * *